United States Patent [19]

Reddy

[11] Patent Number: 5,021,071
[45] Date of Patent: Jun. 4, 1991

[54] VEHICLE FUEL TANK PRESSURE CONTROL METHOD

[75] Inventor: S. Raghuma Reddy, West Bloomfield, Mich.

[73] Assignee: General Motors Corporation, Detroit, Mich.

[21] Appl. No.: 493,261

[22] Filed: Mar. 14, 1990

[51] Int. Cl.[5] .............................................. B01D 51/06
[52] U.S. Cl. ............................................ 55/58; 55/68; 55/389; 55/74; 55/208; 123/518
[58] Field of Search ................... 55/58, 68, 387, 74, 55/208; 123/518-521

[56] References Cited

U.S. PATENT DOCUMENTS

| | | | |
|---|---|---|---|
| 3,280,536 | 10/1966 | Berlin | 55/58 |
| 3,352,294 | 11/1967 | Biller et al. | 55/316 |
| 3,805,493 | 4/1974 | Kennedy et al. | 55/74 |
| 3,844,739 | 10/1974 | Alfrey, Jr. | 55/74 |
| 4,280,466 | 7/1981 | Walters | 123/520 |
| 4,778,495 | 10/1988 | Bishop et al. | 55/269 |
| 4,829,968 | 5/1989 | Onufer | 123/518 |
| 4,869,733 | 9/1989 | Stanford | 55/68 |

*Primary Examiner*—Bernard Nozick
*Attorney, Agent, or Firm*—Patrick M. Griffin

[57] ABSTRACT

Vehicle tank pressure is controlled by adsorbing air from the tank in a zeolite bed, and passing fuel vapor back to the tank. The zeolite is later regenerated by application of heat and vacuum.

2 Claims, 2 Drawing Sheets

VEHICLE FUEL TANK PRESSURE CONTROL METHOD

This invention relates to vehicle fuel tank pressure control in general, and specifically to a method for controlling tank pressure without burning extra fuel vapors in the engine.

BACKGROUND OF THE INVENTION

Vehicle fuel system storage tanks inevitably develop elevated tank pressures as liquid fuel vaporizes into the space between the surface of the fuel and the top of the tank. The vapor so formed is actually a mixture of air and fuel vapors, which forms mainly due to fuel heating. When the tank pressure rises above what is considered a safe threshold, it must be vented somehow. Old systems simply had a vent pipe to atmosphere that was always open. Currently, in order to reduce the emission of raw hydrocarbons into the air, vehicles vent the tank instead to an activated charcoal storage canister. The fuel vapor component of the mixture is adsorbed on the surface of the charcoal granules, so that only the air is expelled to atmosphere. Later, manifold vacuum from the engine is used to draw air from atmosphere back through the canister, purging the fuel vapor to be burned in the engine. Such systems have worked well, but more stringent emission regulations in the future may require even larger canisters to store even more fuel vapor. The prospect of having to burn even more purged fuel vapor has raised concerns about potentially raising exhaust emissions.

SUMMARY OF THE INVENTION

The method for controlling tank pressure disclosed by the invention takes the very different approach of adsorbing the air component of the mixture instead, and expelling the fuel vapor component back to the fuel tank.

In the embodiment disclosed, a closed container is filled with a zeolite material of the type that will adsorb air, but pass hydrocarbons such as fuel vapor. The zeolite will release adsorbed air if subjected to heat and vacuum, both of which are available from the vehicle engine. The top of the fuel tank has a pressure control port with a pressure control valve that will open if the tank pressure rises above a certain threshold. An inlet line between the control port and the top of the container has a valve that allows it to be selectively opened and closed. A first outlet line between the bottom of the container and the fuel tank also has a valve that allows it to be selectively opened and closed, as does a second outlet line between the bottom of the canister and the engine manifold. The outside of the container has a heat jacket connected to the engine heat source by a heating line which, again, may be selectively opened and closed.

The system has both an adsorbing and a regenerating mode. In the adsorbing mode, that is, when the zeolite has not yet been filled to capacity, the second outlet line and the heating line are always closed. During the adsorbing mode, if the tank pressure has not yet exceeded the threshold, the valve in the inlet line is left open, but the inlet line will remain closed by virtue of the still closed pressure control port valve. The valve in the first outlet line is kept closed, as well. However, when the tank pressure rises above the threshold value, the pressure control port valve opens, fully opening the inlet line, and a signal is also sent to open the valve in the first outlet line. A path is thereby completed to admit some of the air and hydrocarbon mixture from the tank to the container. The air is adsorbed in the zeolite, while the hydrocarbon is fed back to the tank through the first outlet line. When the tank pressure again falls below the threshold, the pressure control port valve closes automatically, and a signal is sent to again close the valve in the first outlet line. When the zeolite has been charged to capacity, the inlet line and first outlet line valves are kept closed, while the second outlet line and the heating line are opened. This subjects the charged zeolite to both engine heat and vacuum, desorbing and drawing out the air to the engine. When the zeolite has been fully regenerated, the system returns to the adsorbing mode. All the valves may be conveniently controlled by an on board computer controller.

It is, therefore, a general object of the invention to control vehicle tank pressure without the necessity of burning extra fuel vapor in the engine.

It is another object of the invention to so control tank pressure by using a zeolite storage medium that adsorbs air, but passes hydrocarbons.

It is another object of the invention to use a series of selectively openable and closable lines between the fuel tank, container, and engine so as to switch between an adsorbing mode, when the zeolite is removing air from the tank to control its pressure, and a regenerating mode, when engine vacuum and heat are desorbing the air from the zeolite.

DESCRIPTION OF THE PREFERRED EMBODIMENT

These and other objects and features of the invention will appear from the following written description, and from the drawings, in which.

Figure 1:
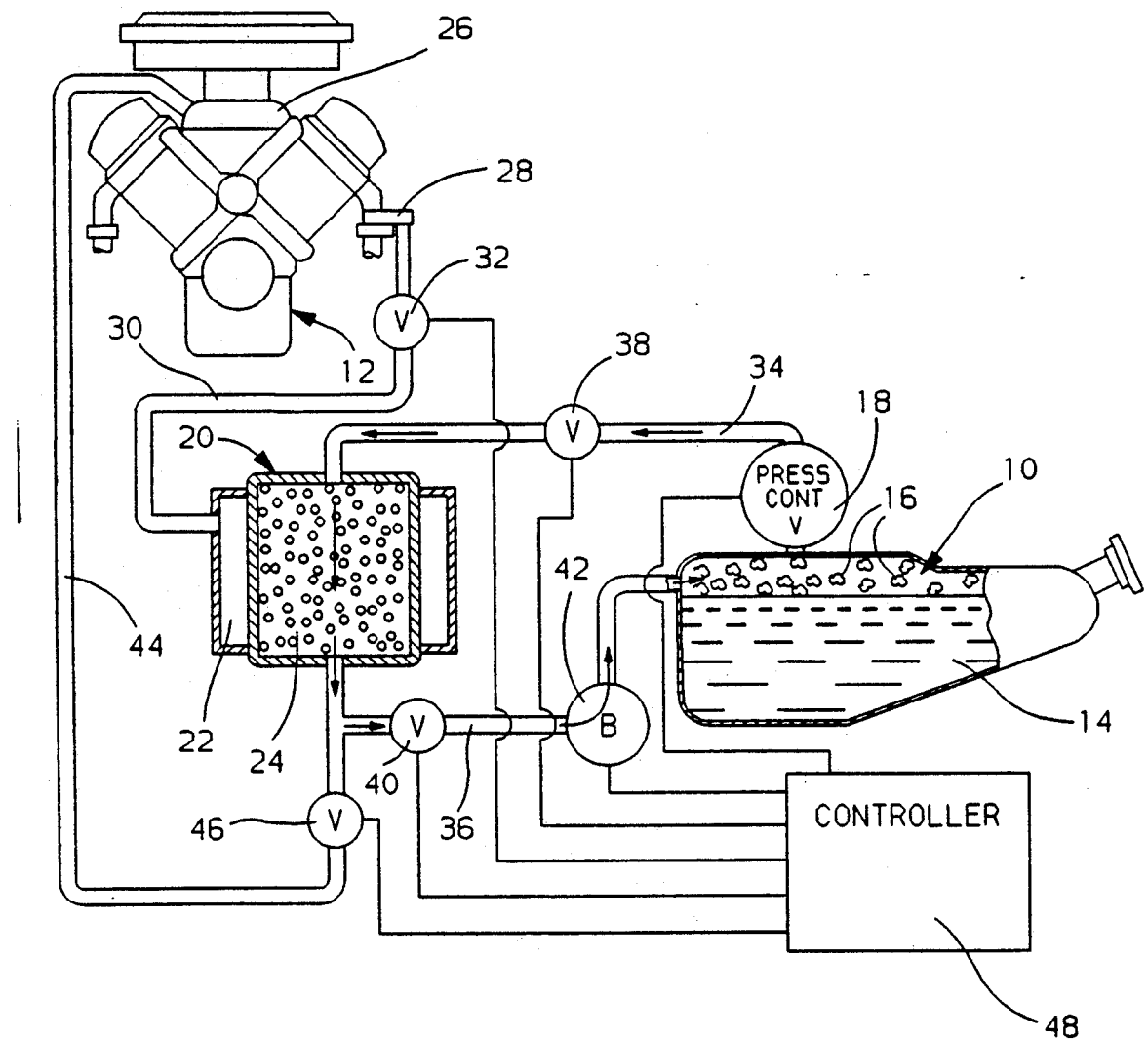
FIG. 1 is a schematic view of a vehicle engine and fuel tank incorporating the tank pressure control method of the invention, in the adsorbing mode.

Referring first to FIG. 1, a vehicle includes a fuel tank, indicated generally at 10, and an engine, indicated generally at 12. Tank 10 contains a level of liquid fuel 14, above which forms a mixture of fuel vapor and air, indicated generally at 16. Mixture 16 can increase the pressure in tank 10 as the temperature increases, due both to heating of the air component, and due to increased vaporization of the liquid fuel 16. To prevent overpressurization, the top of tank 10 has a pressure control port which, in the embodiment disclosed, is a pressure control valve 18 that is designed to open at a predetermined threshold of tank pressure increase, for example, 2 psi over atmospheric pressure. A container, which is a cylindrical metal canister in the preferred embodiment, is indicated generally at 20. The interior of canister 20 is closed, but for the controlled openings described below, and its exterior is surrounded by a heating jacket 22. Canister 20 is filled with a bed of commercially available 4A zeolite, indicated at 24. The number 4 refers to the pore size of the surface of the material, being 4A angstroms. The air component of mixture 16 has the same make up as atmospheric air, mostly molecules of $N_2$, the size of which is about 3 angstroms. The fuel vapor component of the mixture 16 is made of larger molecules, such as Butane, with a size of 4.9 angstroms. The method of the invention takes advantage of the differential between the pore size of the zeolite 24 and the molecular size of the constituents of mixture 16.

Still referring to FIG. 1, engine 12 has a manifold 26, which, if tapped into, provides a source of engine vacuum. The manifold 26 is also hot during engine operation, and a heat stove 28, disposed in heat exchanging relation to manifold 26, provides a source of heat. A heating line 30 from stove 28 to jacket 22 may be selectively opened and closed by a valve 32. Thus, heat can be provided on demand to warm canister 20. Openings to the interior of canister 20 include an inlet line 34 running between the top of canister 20 and pressure control valve 18, and a first outlet line 36 running from the bottom of canister 20 back to tank 10, specifically opening into the space above the level of fuel 14. Inlet line 34 can be opened and closed by a valve 38, while first outlet line 36 is opened and closed by a valve 40. In addition, a blower 42 in first outlet line 36 assists any flow through line 36. A second outlet line 44 leaves canister 20, specifically branching off of first outlet line 36, and runs to manifold 26. Second outlet line 44 may be opened and closed by a valve 46. All four of the selective valves, 32, 38, 40 and 46, as well as the blower 42, are wired to an onboard computer controller 48. Pressure control valve 18 opens automatically when the tank pressure threshold is exceeded, and is also wired to controller 48 so as to signal whether it is open or closed. Controller 48 can be programmed to operate the described components in the manner described next.

Still referring to FIG. 1, an adsorbing mode exists, by definition, at such times that the system is not regenerating, as defined below. This is the majority of the time. Valves 32 and 46 are kept closed, so the heating line 30 and second outlet line 44 are closed, and heat and vacuum cannot reach canister 20. Valve 38 is left open, but if the tank pressure threshold has not been exceeded, then pressure control valve 18 remains closed, and inlet line 34 is closed as a consequence. The signal that pressure control valve 18 is not open is read by controller 48, and valve 40 is kept closed and blower 42 is kept off. Therefore, tank 10 is closed, and its pressure can build as more fuel 14 vaporizes into mixture 16. When the tank pressure threshold has been exceeded, pressure control valve 18 opens, opening inlet line 34 fully, and the opening signal is read by controller 48 to also open valve 40 and energize blower 42. Thus, a path from tank 10 to canister 20 is completed. Mixture 16 can then flow through zeolite 24, and the $N_2$ air component thereof is preferentially adsorbed, while the hydrocarbon vapor component is passed through back to tank 10 through first outlet line 36, as shown by the arrows. This preferential adsorption occurs because of the relative pore sizes described above. The desired pressure range is thereby maintained in tank 10, since molecules of air are removed from mixture 16. The mixture 16 will tend to become more heavily weighted toward the hydrocarbon component as air is progressively removed, but that will only tend to discourage the further vaporization of fuel 14, since an equilibrium condition between liquid and fuel would be reached sooner. Some fuel vapor might even be encouraged to return to the liquid state. This is another advantage of the invention, as contrasted to a conventional system where the progressive removal of fuel vapor would encourage the formation of more.

Figure 2:
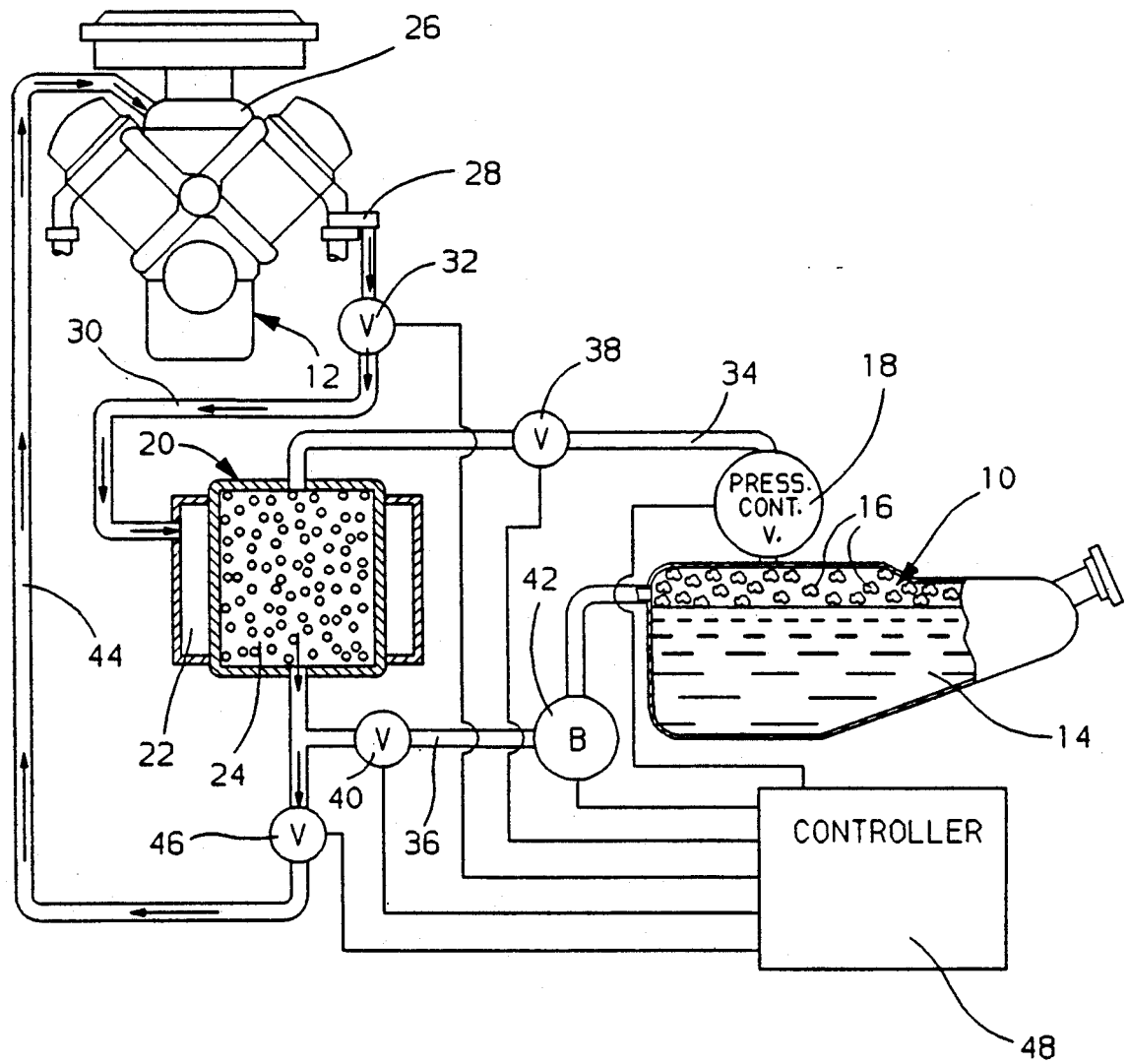
FIG. 2 is a view like 1, but showing the regenerating mode.

Referring next to FIG. 2, the regeneration mode of the system is illustrated. In the embodiment disclosed, the regeneration would be initiated not in response to some directly measured indication that the zeolite 24 had in fact adsorbed as much air as it was capable, but would instead be initiated by controller 48 at a regular interval, such as a predetermined number of drive cycles Also, the controller 48 would be programmed to initiate the regeneration process only after engine 12 had run long enough to get manifold 26 and heat stove 28 sufficiently hot. The valves 38 and 40 are kept closed, while valves 32 and 46 are now opened. A path for heat from heat stove 28 to canister jacket 22 is thereby opened through heating line 30. Vacuum from manifold 26 can reach the interior of canister 20 through second outlet line 44, which is now the only opening to canister 20's interior. The simultaneous application of heat and vacuum to the zeolite 24 acts to desorb the stored air, which is drawn into the manifold 26 and burned, as shown by the arrows. Purging air in this manner, instead of hydrocarbons as is done conventionally, has very little effect on engine emissions. The regeneration process would be carried out by the controller 48 for a sufficient time to remove most or all of the stored air from zeolite 24, an interval which would have to be empirically- determined for each system. When the time has expired, valves 32 and 46 are closed. The regeneration process would leave a vacuum in canister 20, which would need to be relieved as it cooled down. Thus, controller 48 would briefly open valve 40, just long enough to let the vacuum in canister 20 relieve itself by drawing in some of mixture 16, after which valve 40 would again be closed to re-initiate the adsorbing mode.

Variations in the embodiment disclosed and the process described could be made. The valves 38 and 18 could conceivably be combined into one valve, one that would open at the proper threshold, and which could be deliberately closed during the regeneration process. Heat and vacuum could be provided other than from the manifold, as by an electric heater and a separate vacuum pump, which could be selectively applied as desired. This would be more expensive than deriving both from the engine, of course. With proper sensors, canister loading could be continually monitored, and the regeneration mode initiated directly in response thereto, rather than periodically, as disclosed. The air removed during the regeneration process could just be dumped, instead of burning it in the engine, since it isn't a pollutant. Therefore, it will be understood that it is not intended to limit the invention to just the embodiment disclosed.

The embodiments of the invention in which an exclusive property or privilege is claimed are defined as follows:

1. In a vehicle having a fuel storage tank that produces a mixture of air and hydrocarbon vapor that pressurizes said tank, and which requires pressure relief above a predetermined threshold, a method for controlling said tank pressure, comprising the steps of, providing a source of selectively applicable vacuum,
providing a source of selectively applicable heat,
providing said fuel tank with a pressure control port that opens in response to an increase in tank pressure above said predetermined threshold,
providing a closed container filled with zeolite of the type that adsorbs air, but passes hydrocarbon vapor, and from which air may be desorbed by applying heat and vacuum, providing a selectively openable and closable inlet line between said tank control port and said container, providing a selectively openable and closable outlet line between said container and said fuel tank, opening said inlet line and said outlet line, when said tank pressure threshold has been exceeded, thereby admitting air and hydrocarbon to said container, with said air being adsorbed in said zeolite and said hydrocarbon passing back to said fuel tank through said first outlet line, and, closing said inlet line and said first outlet line, and simultaneously applying said heat and vacuum source to said canister, when said zeolite has adsorbed its capacity of air, thereby allowing air to be desorbed from said zeolite.

2. In a vehicle having a fuel storage tank that produces a mixture of air and hydrocarbon vapor that pressurizes said tank, and which requires pressure relief above a predetermined threshold, and also having an engine that provides both a source of engine heat and a source of engine vacuum, a method for controlling said tank pressure, comprising the steps of, providing said fuel tank with a pressure control port that opens in response to an increase in tank pressure above said predetermined threshold, providing a closed container filled with zeolite of the type that adsorbs air, but passes hydrocarbon vapor, and from which air may be desorbed with applied heat and vacuum, providing a selectively openable and closable inlet line between said tank control port and said container, providing a selectively openable and closable first outlet line between said container and said fuel tank, providing a selectively openable and closable second outlet line from said container to said engine vacuum source capable of applying a vacuum to said container when opened, providing a selectively openable and closable heating line from said engine heat source to said container capable of applying heat to said container when opened, opening said inlet line and said first outlet line, while simultaneously closing said second outlet line and heating line, when said tank pressure threshold has been exceeded, thereby admitting air and hydrocarbon to said container, with said air being adsorbed in said zeolite and said hydrocarbon passing back to said fuel tank through said first outlet line, and, closing said inlet line and said first outlet line, and simultaneously opening said heating line and said second outlet line, when said zeolite has adsorbed its capacity of air, thereby allowing air to be desorbed from said zeolite by said engine heat and vacuum.

* * * * *